US010529524B2

(12) United States Patent
Scott et al.

(10) Patent No.: US 10,529,524 B2
(45) Date of Patent: Jan. 7, 2020

(54) SUBSEA REPLACEABLE FUSE ASSEMBLY

(71) Applicant: Subsea 7 Limited, Sutton (GB)

(72) Inventors: Alister William Ernest Scott, Kingswells (GB); James Peter McDonald, Aberdeen (GB)

(73) Assignee: Subsea 7 Limited, Sutton (GB)

( * ) Notice: Subject to any disclaimer, the term of this patent is extended or adjusted under 35 U.S.C. 154(b) by 539 days.

(21) Appl. No.: 15/307,786

(22) PCT Filed: Apr. 30, 2015

(86) PCT No.: PCT/GB2015/051263
§ 371 (c)(1),
(2) Date: Oct. 28, 2016

(87) PCT Pub. No.: WO2015/166252
PCT Pub. Date: Nov. 5, 2015

(65) Prior Publication Data

US 2017/0053767 A1 Feb. 23, 2017

(30) Foreign Application Priority Data

Apr. 30, 2014 (GB) .................................. 1407583.2

(51) Int. Cl.
*H02H 5/00* (2006.01)
*H01H 85/00* (2006.01)
*H01B 9/00* (2006.01)

(52) U.S. Cl.
CPC ........... *H01H 85/003* (2013.01); *H01B 9/003* (2013.01); *H01H 2231/044* (2013.01)

(58) Field of Classification Search
None
See application file for complete search history.

(56) References Cited

U.S. PATENT DOCUMENTS

| | | | | |
|---|---|---|---|---|
| 3,450,948 | A | 6/1969 | Gerlach et al. | |
| 3,582,978 | A * | 6/1971 | Petersen | H01J 29/925 174/50.52 |
| 4,142,770 | A * | 3/1979 | Butler, Jr. | H01R 13/523 439/140 |
| 4,603,315 | A | 7/1986 | Leong et al. | |
| 4,952,900 | A | 8/1990 | Cameron et al. | |
| 5,772,473 | A | 6/1998 | Cheng et al. | |
| 6,679,724 | B2 * | 1/2004 | Hillman | H01R 13/523 285/93 |

(Continued)

FOREIGN PATENT DOCUMENTS

| | | |
|---|---|---|
| CA | 1 252 501 | 4/1989 |
| EP | 2 492 947 | 8/2012 |

(Continued)

*Primary Examiner* — Stephen W Jackson
(74) *Attorney, Agent, or Firm* — Levy & Grandinetti

(57) ABSTRACT

A subsea-replaceable fuse assembly has at least one fuse and a wet-mateable fuse connector element. The connector element is arranged to connect the fuse assembly to a subsea electrical load requiring protection of the fuse. The fuse connector element has conductor elements that are electrically connected to the fuse. A corresponding method of protecting a subsea electrical load includes connecting a fuse to the load underwater in a wet-mating operation effected between connector elements that are electrically connected, respectively, to the fuse and to the load.

16 Claims, 7 Drawing Sheets

(56) References Cited

U.S. PATENT DOCUMENTS

| | | | | |
|---|---|---|---|---|
| 9,035,739 | B2 * | 5/2015 | Boe | H01H 85/0021 337/186 |
| 9,988,129 | B2 * | 6/2018 | Jamieson | B63G 8/001 |

FOREIGN PATENT DOCUMENTS

| | | |
|---|---|---|
| EP | 2 495 746 | 9/2012 |
| EP | 2 565 899 | 3/2013 |
| GB | 2480321 | 11/2011 |
| GB | 2501249 | 10/2013 |
| WO | WO 2006/070078 | 7/2006 |
| WO | WO 2006/089904 | 8/2006 |
| WO | WO 2008/004084 | 1/2008 |
| WO | WO 2010/019046 | 2/2010 |
| WO | WO 2012/116910 | 9/2012 |

* cited by examiner

SUBSEA REPLACEABLE FUSE ASSEMBLY

This invention relates to subsea fuse assemblies that are suitable for use in electrical power circuits of subsea oil and gas installations. In particular, the invention provides an underwater-replaceable fuse assembly for protecting high-power, high-tension subsea electrical equipment such as a transformer or a trace-heating system for a pipe-in-pipe installation.

Subsea installations for offshore oil and gas production require control electronics and electrical power circuits to be implemented and maintained deep underwater. As items of high-voltage equipment such as pumps are increasingly placed underwater as part of such installations, the need for subsea electrical power circuits has increased accordingly. Such circuits are characterised by large electrical loads that draw high currents or operate at high voltages.

As subsea oil exploration and production move into deeper waters beyond the continental shelf, there is a corresponding need for electrical power circuits to be operable at great depth. Typical water depths at such locations are far in excess of diver depth, for example 2000 to 3000 metres or more. Consequently, installation and maintenance operations require intervention by underwater vehicles, generally unmanned underwater vehicles (UUVs) such as remotely-operated vehicles (ROVs) or autonomous underwater vehicles (AUVs).

ROVs are characterised by a physical connection to a surface support ship via an umbilical tether that carries power and data including control signals. AUVs are autonomous, robotic counterparts of ROVs that move from task to task on a programmed course under on-board battery power, without a physical connection to a support facility such as a surface support ship.

It is, of course, well known to use fuses or circuit breakers to isolate a faulty circuit so as to protect electrical equipment from over-currents, such as are caused by short-circuit conditions. The electrical power circuits of subsea installations are no different. However, circuit breakers are not suitable for subsea use as they would require a UUV and potentially also a surface support ship to be on permanent standby in case a circuit breaker trips and needs to be reset. In this respect, circuit breakers contain moving parts that can be tripped during the installation process or during other subsea operations, thereby giving false indications of electrical faults. In contrast, fuses have no moving parts and should only fail due to a genuine electrical fault.

WO 2012/116910 summarises the development of subsea fuses. It notes that a fuse for shallow subsea applications may comprise a pressure-resistant canister housing a dry fuse element at near-atmospheric pressure. However, such an arrangement may become impractical under the extreme hydrostatic pressure of great depth, due to the bulk, weight and cost of the canister and the technical demands on penetrators, being connections that penetrate the canister wall.

To overcome the drawbacks of pressure-resistant canisters, WO 2012/116910 notes that pressure-compensated canisters filled with a dielectric liquid at near-ambient water pressure may be used instead. However, an explosive shock-wave inside a liquid-filled canister when the fuse blows risks damaging other electrical components or contaminating the surrounding dielectric liquid, which may in turn cause failures in other components exposed to the dielectric liquid.

Consequently, WO 2012/116910 proposes a fuse arranged inside a sealed pressure-compensated enclosure filled with dielectric liquid. As the dielectric liquid is confined in the enclosure and the enclosure is sealed to the outside, this prevents damage to components outside the enclosure, or contamination of dielectric liquid outside the enclosure, when the fuse blows.

The fuse proposed in WO 2012/116910 is not arranged to enable replacement underwater. Also, the fuse has a complex and leak-prone structure comprising a metal enclosure, a flexible pressure-compensating element in the enclosure, insulating penetrators passing through the enclosure, and a sand-filled ceramic fuse housing surrounding a fuse element. The enclosure and the fuse housing are flooded with dielectric liquid. The enclosure may contain more than one fuse housing and more than one fuse element, and may have more than one pressure compensator.

Similarly, WO 2008/004084 discloses subsea switchgear apparatus comprising one or more replaceable water-tight canisters that contain circuit breakers. When a circuit breaker in the canister is to be replaced or repaired, the canister is removed from the remainder of the switchgear apparatus. However, removing a canister is a complex operation that requires the switchgear apparatus to be taken out of normal operation and is not apt to be performed remotely in deep water. Also, as each canister is filled with a dielectric fluid such as oil and is pressure-compensated, it has a complex and leak-prone structure like that of WO 2012/116910 noted above.

The patent literature contains many earlier examples of subsea fuses for protecting subsea electrical circuits. For example, WO 2006/089904 describes an underwater electrical DC network including fuses. In view of the hazard presented by electrical power underwater, such fuses are often permanently embedded in watertight systems or control modules. This means that the entire system or module has to be replaced if a fuse blows. In practice, this may involve returning a system or module to the surface for maintenance or engaging in a lengthy, difficult and expensive subsea intervention to swap out the system or module at the seabed.

As a further example of this problem, EP 2492947 discloses a fusible conductor trace on a printed circuit board for subsea use. If the fuse blows, the whole printed circuit board (in practice, usually an entire module incorporating the circuit board) has to be replaced. Also, the printed circuit board solution of EP 2492947 is suitable only for low-voltage electronic applications.

Similarly, UUVs such as ROVs have electrical systems protected by low-voltage fuses. However, if such a fuse fails, the UUV must be brought to the surface for the fuse to be replaced.

U.S. Pat. No. 3,450,948 discloses encapsulated fuses for underwater use but there is no provision for the fuses to be replaced. EP 2565899 describes a pressure-resistant ceramic housing for a subsea fuse. Again, there is no provision for the fuse to be replaced.

In general, electrical power circuits of subsea installations require reinforced electrical isolation to avoid electrical contact with seawater. Isolating material has to withstand contact with seawater, hydrostatic pressure and also thermal differentials between the power circuit and cold water.

As interfaces are a weak-point for water-tightness, conventionally only permanent interfaces are employed. Thus, underwater fuses are typically placed inside pressure-resistant, leak-tight housings that are integral with power cables, so that the electrical interface is realised inside the housing. Replacement of such fuses requires disconnecting the cable and recovering at least part of the cable with the housing and fuse.

In another approach, an isolated work chamber may be clamped around a fuse housing. This allows the fuse housing to be opened in a dry atmosphere inside the chamber so that fuses in the housing may be replaced without exposure to water. Once the fuse housing is closed, the chamber can be flooded and removed. However, this dry replacement method is extremely complex.

It is against this background that the present invention has been devised.

In one sense, the invention resides in a subsea-replaceable fuse assembly comprising: a plurality of fuses; and a wet-mateable fuse connector element arranged to connect the fuse assembly to a subsea electrical load requiring protection of the fuse, the fuse connector element comprising conductor elements that are electrically connected to the plurality of fuses. The conductor elements define a plug for engagement with a socket provided on the subsea electrical load to connect the plurality of fuses electrically to the subsea load; and wherein the fuse connector element comprises a body having a recess surrounded by a skirt, the recess housing the plug, such that when the plug is engaged with a socket on the subsea electrical load, the skirt is received in a recess on the socket to seal the recess in the body of the fuse connector element.

'Wet-mating' is a term that is familiar to, and clearly understood by, those skilled in the art of subsea engineering. Unlike the fuse-replacement operations of the prior art discussed above—which may be characterised as assembly and disassembly operations that are particularly challenging to perform underwater—wet-mating involves making or breaking electrical or other connections by a simple, usually unidirectional coupling or decoupling movement.

Typically, wet-mating involves simply inserting a plug into a socket, although supplementary locking, latching or sealing operations may also take place. For example, sealing may involve inflatable seals or water-tight bladders. Breaking the connection involves a similarly-simple reverse operation, typically involving pulling the plug out of the socket. As such, wet-mating is apt to be performed in deep water by a UUV; it is also apt to be performed in shallow water by a diver.

The fuse of the assembly, especially when potted, provides a compact means for protecting a high-voltage electrical circuit. In using a wet-mateable connector the bulky housings required by conventional connectors for underwater fuses are not required, and the resulting fuse assembly is more compact, to the extent that the assembly can be handled by an ROV without requiring additional support frames or structures. Furthermore, the fuse assembly allows a plurality of fuses to be connected to the subsea electrical load at the same time, via a single connector.

As expressed in the specific description that follows, the invention contemplates two main approaches. A fuse assembly may be appended to a wet-mateable male connector element, which may be a largely standard off-the-shelf item. Alternatively, a fuse assembly may be integrated with a male connector element, to be inserted into a receptacle of a female connector element during wet-mating.

In one approach of the invention, a subsea cable may extend between the fuse connector element and a fuseholder module containing the fuses, which cable electrically connects the fuses to the conductor elements and supports the housing from the fuse connector element. Such a cable is suitably filled with a dielectric liquid. In another approach of the invention, the fuses are contained in a fuseholder module that is integral with the fuse connector element.

The fuses may be supported in air in the fuseholder module, in which case the air in the fuseholder module may be at surface pressure or, with pressure compensation, at the pressure of surrounding water. In either case, the fuseholder module is preferably arranged to isolate the fuses from water. The fuses may be potted in a capsule, which provides a particularly compact fuse arrangement that can withstand high voltages.

For ease of handling remotely underwater, the fuse connector element advantageously comprises a UUV handle arranged to be grasped for manipulation by a UUV.

The plurality of fuses may be held in a fuseholder module in a plurality of chambers, each chamber holding a fuse. The subsea cable may comprise a bundle of cables, which cables may electrically connect each of the plurality of fuses to respective conductor elements.

The inventive concept embraces a combination of the fuse assembly of the invention and a subsea electrical load that is electrically connected to corresponding conductor elements of a complementary load connector element. That combination may further comprise a subsea installation including the subsea electrical load.

The inventive concept extends to a subsea installation including an electrical load and a wet-mateable load connector element arranged to connect the load to a subsea-replaceable fuse assembly, the load connector element comprising conductor elements that are electrically connected to the load.

A corresponding method of protecting a subsea electrical load in accordance with the invention comprises connecting fuses to the load underwater in a wet-mating operation effected between connector elements that are electrically connected, respectively, to the fuses and to the load, wherein the connector element comprises a plug arranged in a recess on a body of the connector element, the recess being surrounded by a skirt, and wherein the method further comprises inserting the plug into a socket on the load such that the skirt engages with the socket to seal the recess.

In order that the present invention may be more readily understood, reference will now be made, by way of example, to the accompanying drawings, in which.

Figure 1:
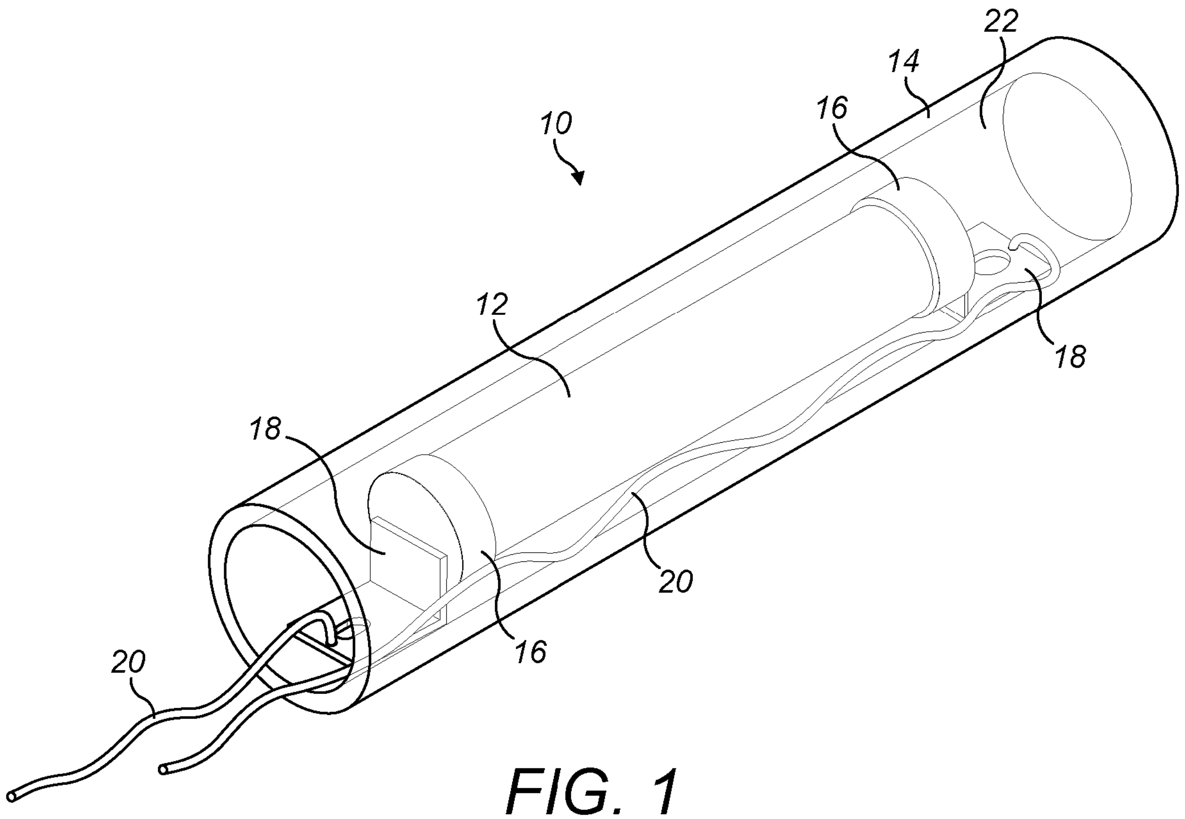
FIG. 1 is a perspective view of a potted fuse capsule in accordance with the invention.

FIG. 1 of the drawings shows a potted fuse capsule 10 comprising a cylindrical subsea fuse 12 extending coaxially within a tubular plastics housing 14. To be suitable for subsea transformer protection, the fuse 12 is rated for high voltage—for example 10 A/3.6 kV—and has a high rupturing capacity. An example of such a fuse is supplied by Cooper Bussmann™ under part number 3.6WJON610.

The housing 14 can be cut from pipe of PVC or ABS, which in this example is nominally 300 mm long with a 60 mm OD and a wall thickness of 5.8 mm. However, the length, diameter and wall thickness of the pipe may of course vary, provided that the interior of the pipe is large enough to accommodate the fuse 12.

The ends of the fuse 12 are cupped by respective metal brackets 16 that are held in conductive contact with the fuse 12 to pass current through a fusible element inside the fuse 12. Each bracket 16 includes a metal tab 18 to which a respective insulated wire 20 is soldered to connect the fuse 12 to the electrical equipment it protects.

Both of the wires 20 extend as a pair out of one end of the housing 14. Consequently, the wire 20 that is soldered to the bracket 16 at the far end of the fuse 12 lies beside the fuse 12, between the fuse 12 and the housing 14.

The space around the fuse 12 and the wires 20 within the housing 14 is filled with a potting compound 22, which may for example be a urethane resin such as Scotchcast™ 2130 supplied by 3M™. Care must be taken when potting to ensure that the space within the housing 14 is completely filled and therefore that any air bubbles in the potting compound are eliminated before that compound cures.

Figure 2:
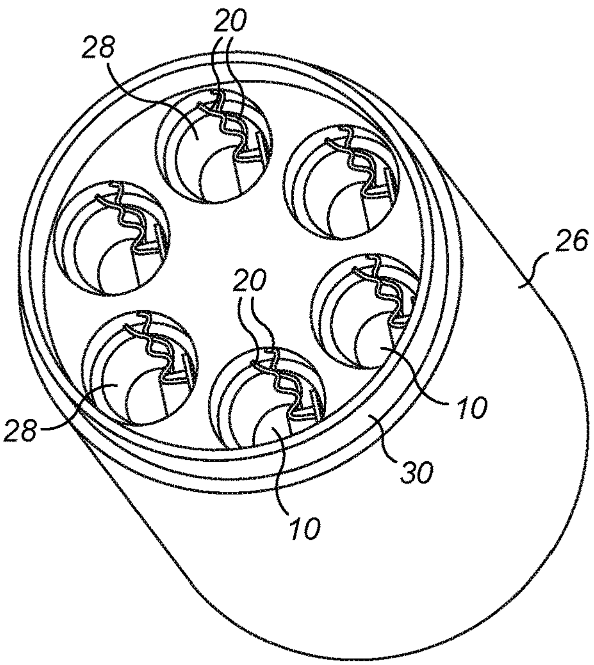
FIG. 2 is a perspective view of a fuseholder module in accordance with the invention, containing in this example six of the fuse capsules of FIG. 1.
Figure 3:
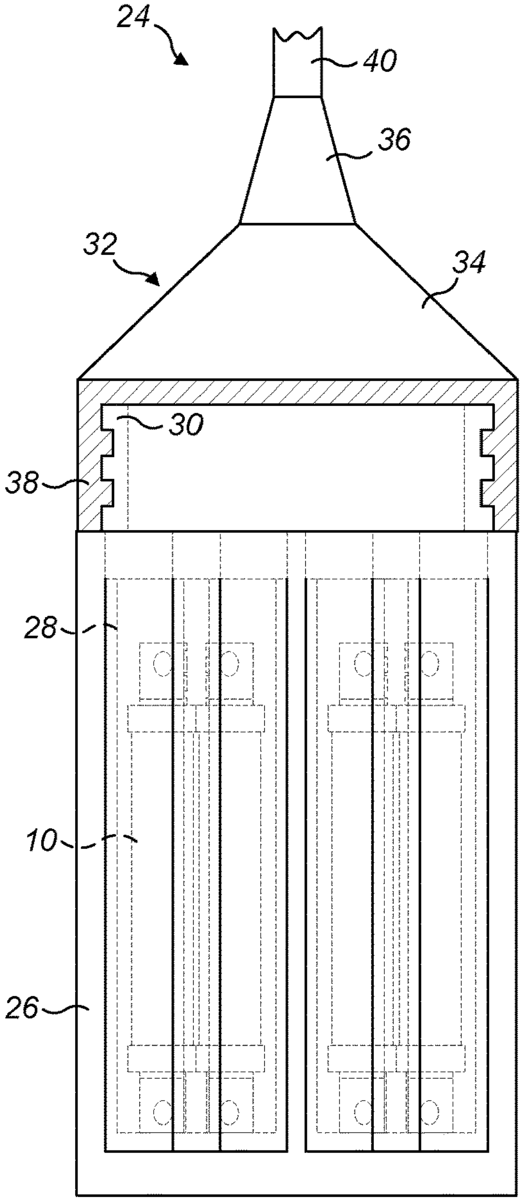
FIG. 3 is a part-sectioned side view of the fuseholder module of FIG. 1 incorporated into a subsea housing in accordance with a first embodiment of the invention.
Figure 4:
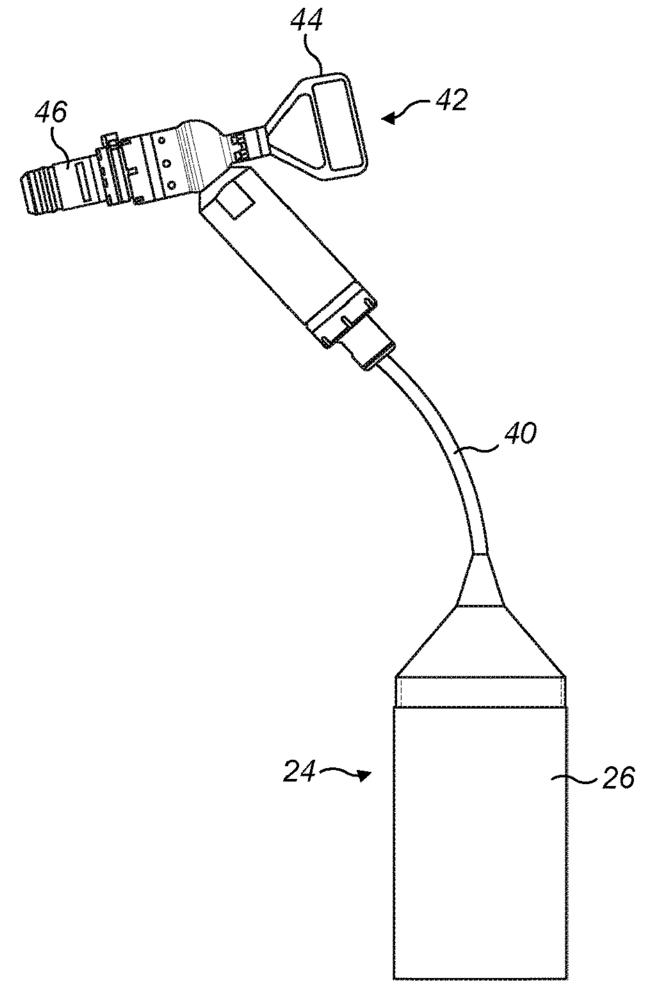
FIG. 4 is a side view of a subsea replaceable fuse assembly comprising the subsea housing of FIG. 3 and a wet-mateable connector at the distal end of an oil-filled subsea cable emerging from the housing.

Reference is now made to FIGS. 2 to 4 of the drawings. FIGS. 3 and 4 show a cartridge-like fuseholder module 24 containing six of the fuse capsules 10 shown in FIG. 1. For this purpose, FIG. 2 shows that a cylindrical hollow body 26 of the fuseholder module 24 contains six tubular chambers 28, one per fuse capsule 10. The body 26 has an open top end and a closed bottom end. The open end of the body 26 is surmounted and surrounded by a circumferential flange 30.

The chambers 28 lie on parallel longitudinal axes that are spaced equi-angularly about a central longitudinal axis of the body 12. Pairs of wires 20 of the fuse capsules 10 protrude from the chambers 28 at the open end of the body 26 for connection to equipment that is to be protected by the fuse capsules 10.

With specific reference now to FIG. 3, the fuseholder module 24 is completed by an end cap 32 that closes the open end of the body 26. The end cap 32 comprises a frusto-conical wall 34 that tapers to a cable anchor 36 at one end and opens to a circumferential skirt 38 at the other end. The skirt 38 surrounds and engages with the flange 30 on the body 26 of the fuseholder module 24.

The pairs of wires 20 from the fuse capsules 10 in the body 26 are bundled together into a short flexible subsea cable 40 that protrudes from the cable anchor 36 of the end cap 32. The cable 40 and spaces in the interior of the fuseholder module 24 are filled with a dielectric liquid such as oil to resist hydrostatic pressure at depth. Well-known pressure-compensating features may be added to the fuseholder module 24 if required.

Turning now to FIG. 4, the cable 40 extending from the fuseholder module 24 leads to a wet-mateable male connector element 42 that is adapted to be manipulated by a UUV. Consequently, a proximal end of the connector element 42 comprises a handle 44 that is arranged to be grasped by a grab on a manipulator arm of a UUV. A distal end of the connector element 42 comprises a plug 46 that fits into a socket (not shown) to connect the fuse capsules 10 of the fuseholder module 24 into power circuits of a subsea installation, which circuits further comprise the electrical equipment that the fuse capsules 10 will protect.

By way of example, WO 2010/019046 and WO 2006/070078 disclose various wet-mateable connectors used to connect electrical systems underwater. Those documents also discuss the technical background of making subsea electrical connections. The connector element 42 works on similar well-known principles.

Figure 5:
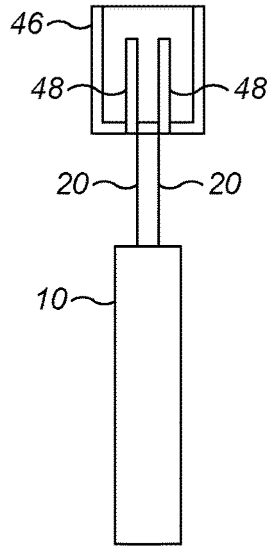
FIG. 5 is a schematic side view of conductor elements within the wet-mateable connector of FIG. 4, those elements being exemplified here as pins, showing how a fuse capsule is connected by a pair of wires to a pair of pins.

Thus, with reference now to FIG. 5, this shows schematically a pair of conductor elements within the plug 46, those conductor elements being exemplified here as pins 48 that are cooperable with female conductor elements of a complementary socket. The pins 48 are connected via the wires 20 to the fuse capsules 10 within the body 26 of the fuseholder module 24. There is one pin 48 for each wire 20. Thus, six fuse capsules 10, each with a pair of wires 20, equates to a total of twelve pins 48 arranged in six pairs within the plug 46. Each pair of pins 48 is part of a respective electric circuit that connects one pin 48 of a pair to a fuse capsule 10 and that similarly connects that fuse capsule 10 to the other pin 48 of the pair. The pins 48 of each pair are connected in series with the fuse capsule 10 connected between them.

For simplicity, FIG. 5 shows how just one of the fuse capsules 10 is connected by a pair of the wires 20 to a pair of the pins 48 in the plug 46. It will also be noted from FIG. 5 that the pins 48 or other conductor elements in the plug 46 lie parallel to each other and to the coupling direction of insertion of the plug 46 into a complementary socket.

The first embodiment illustrated in FIGS. 2 to 5 separates the fuseholder module 24 from the wet-mateable connector element 42 but connects them electrically and structurally via the subsea cable 40, by which the fuseholder module 24 hangs from the connector element 42. In contrast, the second embodiment illustrated in FIGS. 6 to 12 integrates a fuseholder module rigidly with a wet-mateable connector element and omits the subsea cable 40.

Figure 12:
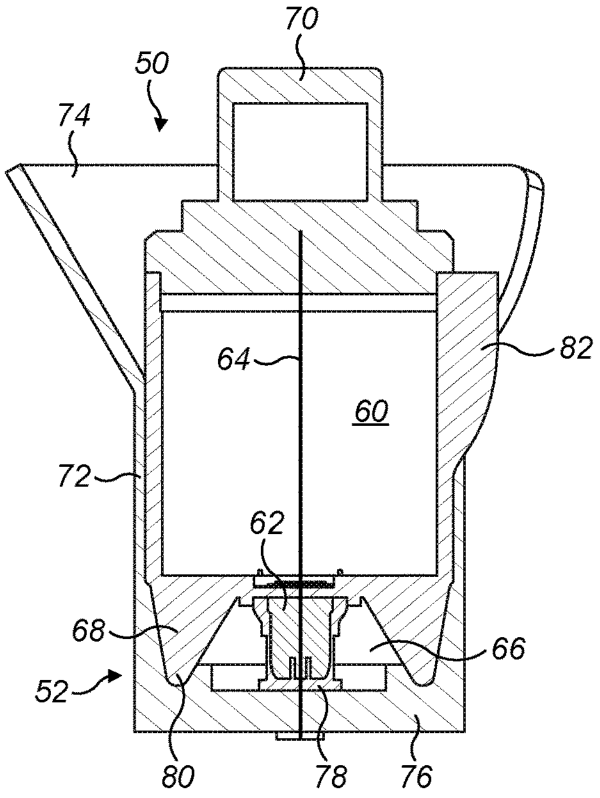
FIG. 12 is a sectional side view that corresponds to FIG. 11 but shows the connectors of the plug and socket now engaged as the plug reaches the base of the socket.

FIGS. 6 to 11 of the drawings show a male connector element 50 aligned with, and approaching wet-mated engagement inside, a female connector element 52. FIG. 12 shows the male connector element 50 fully wet-mated with the female connector element 52.

Figure 6:
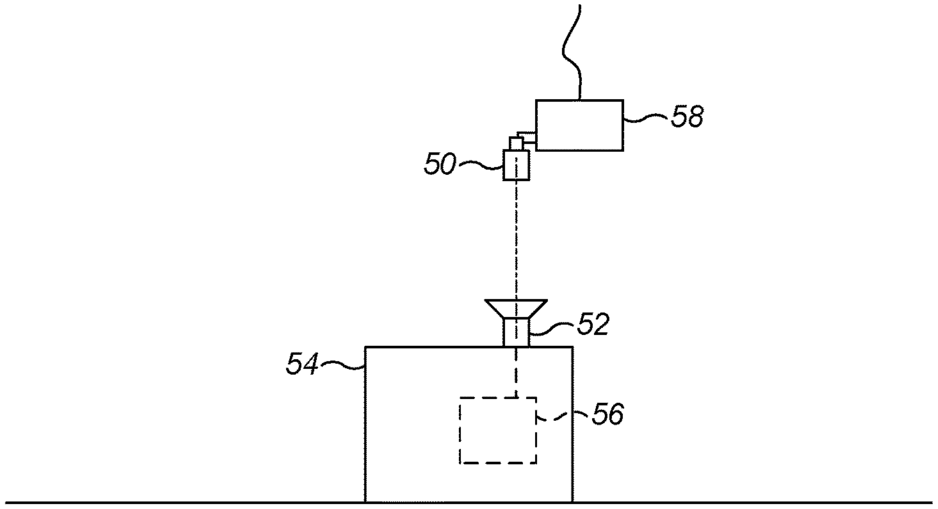
FIG. 6 is a schematic side view of a subsea installation including an electrical load, the installation having a female connector element, and an ROV carrying a male connector element with an integrated fuseholder module in accordance with a second embodiment of the invention.
Figure 7:
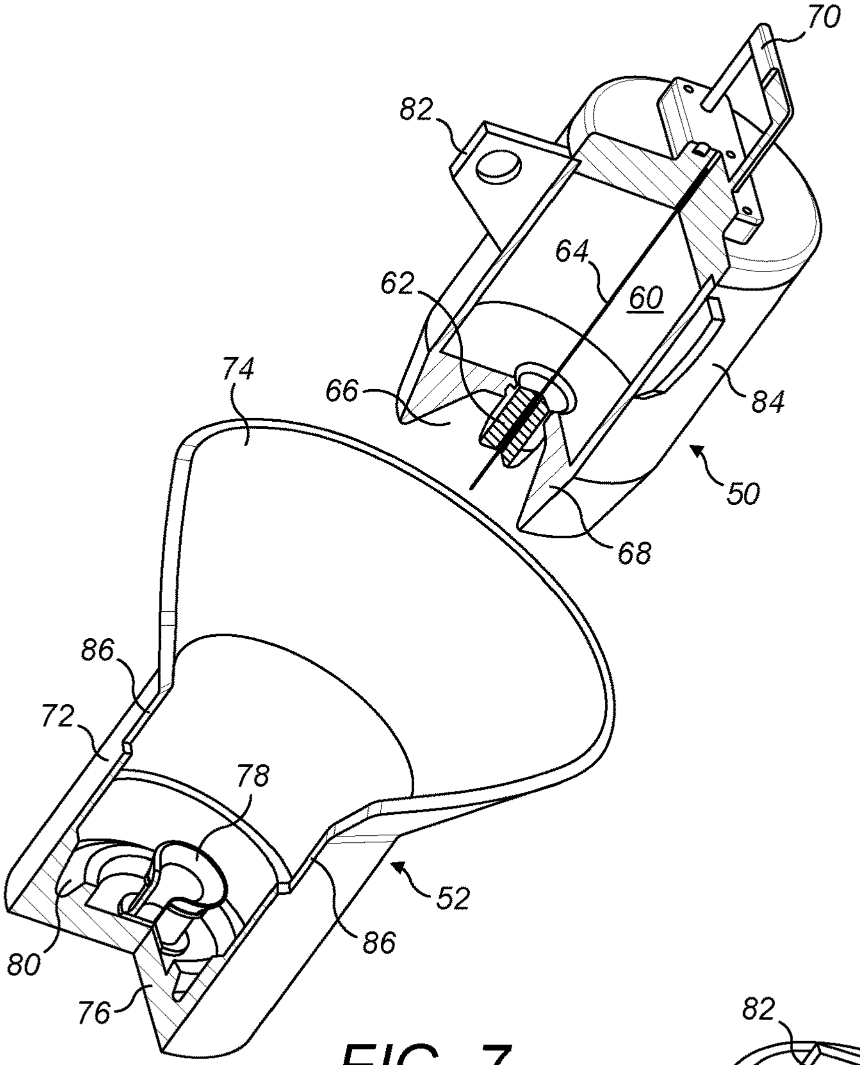
FIG. 7 is a part-sectioned perspective view of a subsea plug and socket assembly usable in the second embodiment of the invention, the plug comprising a subsea housing for the fuseholder module of FIG. 2 and having a wet-mateable connector that is cooperable with a complementary connector of the socket.
Figure 8:
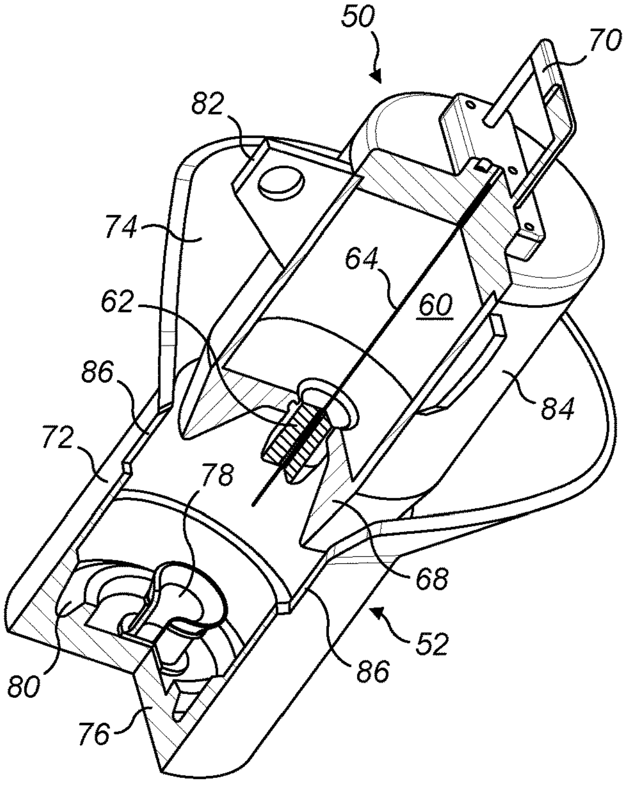
FIG. 8 is a part-sectioned perspective view that corresponds to FIG. 7 but shows the plug being inserted into the socket.
Figure 9:
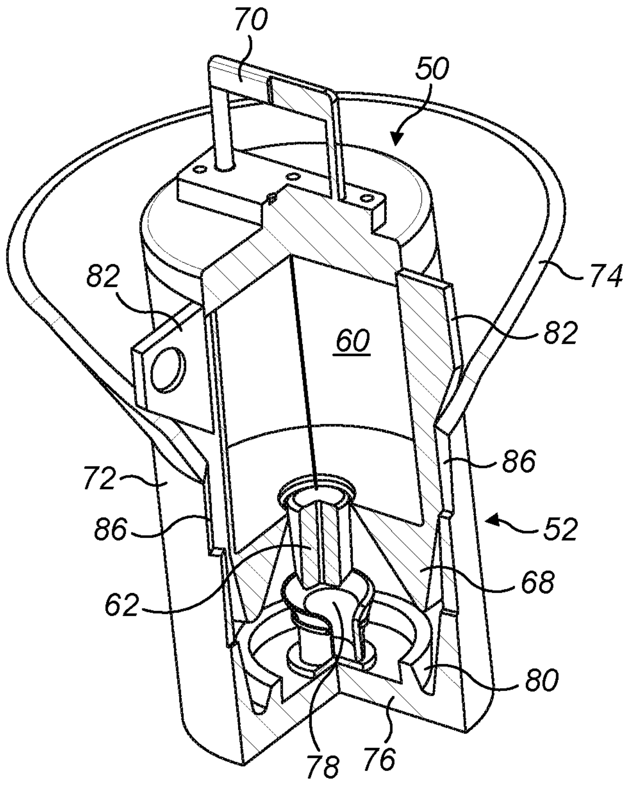
FIG. 9 is a part-sectioned perspective view that corresponds to FIG. 8 but shows the connectors of the plug and socket approaching engagement as the plug nears the base of the socket.

As FIG. 6 shows schematically, the female connector element 52 is suitably mounted to a subsea installation 54 comprising electrical equipment 56 that requires protection of fuse capsules 10 in the male connector element 50. The male connector element 50 is carried by an ROV 58 until being wet-mated with the female connector element 52.

Specifically, as FIGS. 7 to 12 show, the male connector element 50 is a hollow cylinder containing a cylindrical internal cavity 60 for accommodating a fuseholder module. Whilst omitted from FIGS. 7 to 12, the fuseholder module that fits into the cavity 60 may be like the cylindrical hollow body 26 of the fuseholder module 24 shown in FIGS. 2 to 4, comprising one or more tubular chambers each containing a potted fuse capsule 10 as shown in FIG. 1.

Wires extending from the, or each, potted fuse capsule 10 in the cavity 60 are connected to respective conductor elements of a plug 62 in a distal end of the male connector element 50. The conductor elements of the plug 62 are suitably arranged in similar manner to the pins 48 of FIG. 5. The plug 62 lies on the central longitudinal axis 64 of the male connector element 50, where it lies in a recess 66 surrounded and defined by a distally-tapering skirt 68 that forms a hollow interface cone. The male connector element 50 further comprises a handle 70 at its proximal end that is arranged to be grasped by a grab on a manipulator arm of a UUV such as the ROV 58 shown in FIG. 5.

The female connector element 52 comprises a tubular base portion 72 whose internal diameter is slightly greater than the external diameter of the male connector element 50. An outwardly-flared frusto-conical mouth 74 guides the interface cone defined by the distally-tapering skirt 68 of the male connector element 50 into alignment and engagement with the tubular base portion 72 of the female connector element 52.

Figure 10:
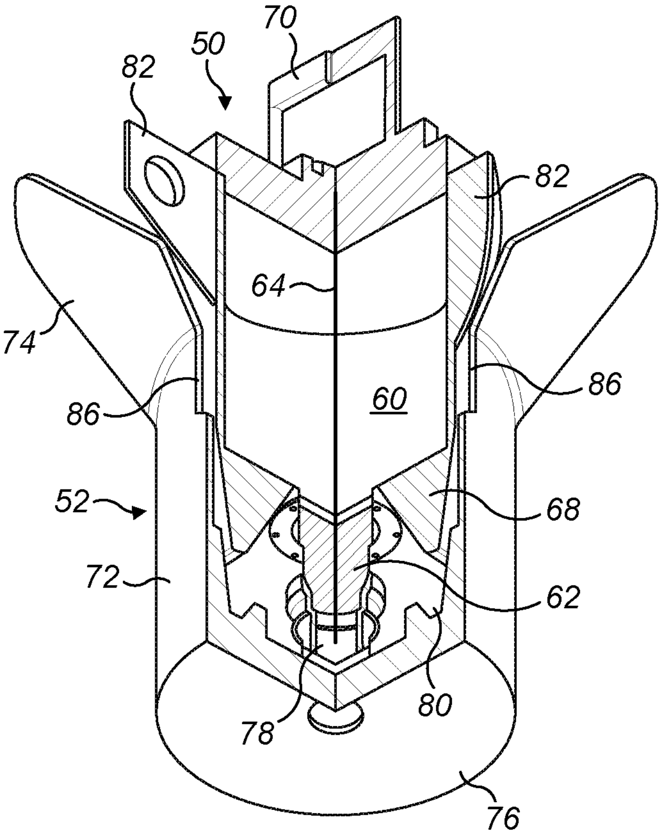
FIG. 10 is a part-sectioned perspective view that corresponds to FIG. 9 but shows the socket from underneath.
Figure 11:
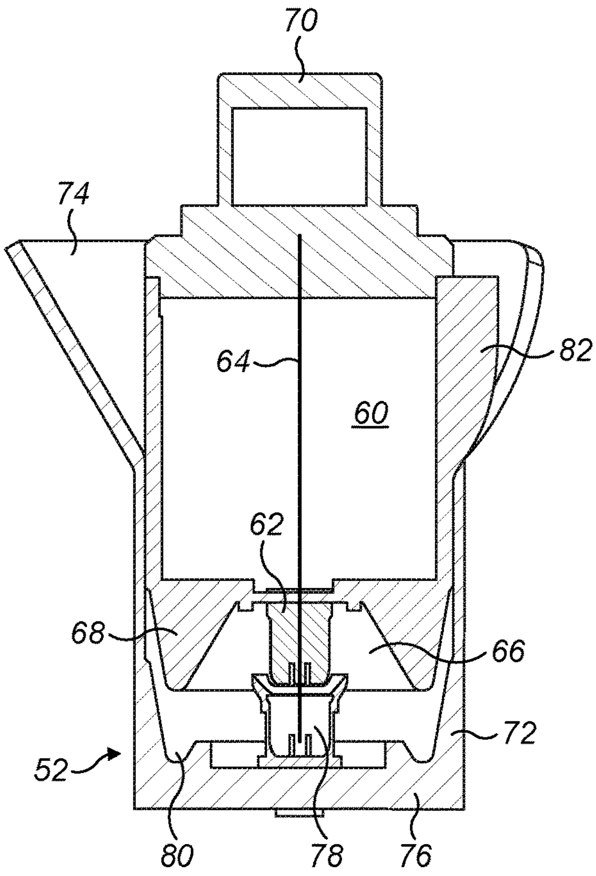
FIG. 11 is a sectional side view of the plug and socket assembly shown in FIGS. 7 to 10, with the connectors of the plug and socket approaching engagement as the plug nears the base of the socket.

The tubular base portion 72 of the female connector element 52 is closed by an end wall 76 that supports a socket 78 in alignment with the central longitudinal axis 64. The socket 78 is surrounded by an annular recess 80 that receives the skirt 68 of the male connector element 50 when the male connector element 50 is engaged inside the tubular base portion 72 of the female connector element 52. At this point, as shown in FIG. 10 of the drawings, the plug 62 of the male connector element 50 engages with the socket 78. Conductor elements of the socket 78 then connect the fuse capsules 10 of the male connector element 50 into power circuits of the subsea installation 54, which circuits comprise the electrical equipment 56 that the fuse capsules 10 will protect.

Alignment flanges 82 lie in mutually-orthogonal planes containing the central longitudinal axis 64 and project radially outwardly from the tubular side wall 84 of the male connector element 50. The alignment flanges 82 fit into respective longitudinal slots 86 in the female connector element 52 to ensure correct angular alignment between the connector elements 50, 52 before engagement of the plug 62 within the socket 78.

In all embodiments of the invention, the male connector element connected to the fuse capsules remains in situ within the complementary socket of the subsea installation until a fuse blows. In that event, when an overload situation has been remedied, electrical power may be switched to auxiliary circuits and fuses in the male connector element. Alternatively, the male connector element can be withdrawn from the socket underwater so that a new male connector element connected to a new set of fuse capsules can be put in place.

The invention provides a fuse module to achieve electrical isolation and protection of subsea power units. It is designed to last up to twenty-five years but is removable and replaceable subsea if a fuse blows, hence being wet-mateable. The module is installable and replaceable by ROV intervention and so is ROV-deployable, with ROV handling interfaces and an ROV locking mechanism.

Many variations are possible within the inventive concept. For example, in shallow-water applications, one or more dry fuses could be housed in a dry housing and connected via a standard dry cable to a wet-mateable connector element. Alternatively, the dry cable could be replaced with a cable filled with a dielectric liquid such as oil. In another shallow-water approach that omits a cable, a dry fuse in a dry housing may be integrated with a wet-mateable connector element.

More generally, the following fuse options are possible: dry; potted; or bathed in a dielectric liquid, any of which may be applied to single or multiple fuses. The housing may be: dry; filled with a dielectric liquid; fully potted (that is, entirely filled with a potting compound); or partially potted (that is, part-filled with a potting compound, the remainder of the housing being dry or filled with a dielectric liquid). Cable options are: a standard dry cable; a wet cable filled with a dielectric liquid such as oil; or no cable if the housing is integrated with or directly mounted to a wet-mateable connector element. Any of these fuse options, housing options and cable options may be used in any combination.

Figure 13:
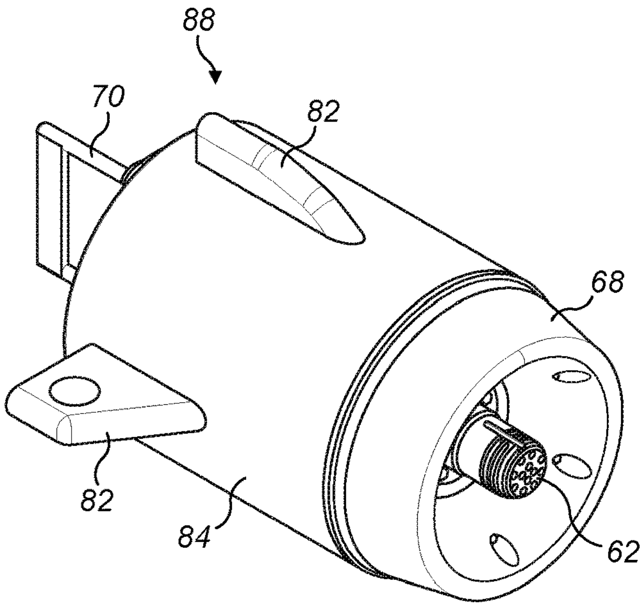
FIG. 13 is a perspective view of a plug being a variant of the plug shown in FIGS. 7 to 12.
Figure 14:
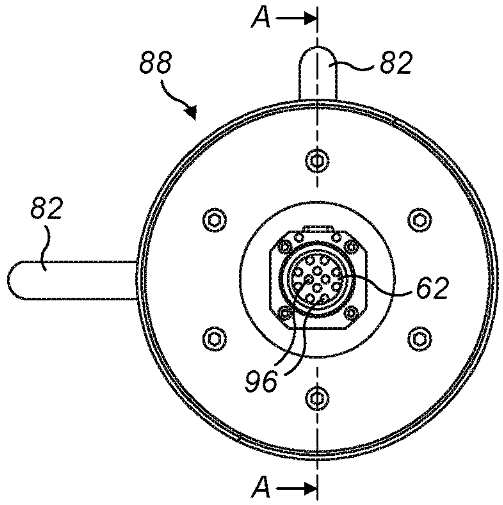
FIG. 14 is an end view of the plug shown in FIG. 13.
Figure 15:
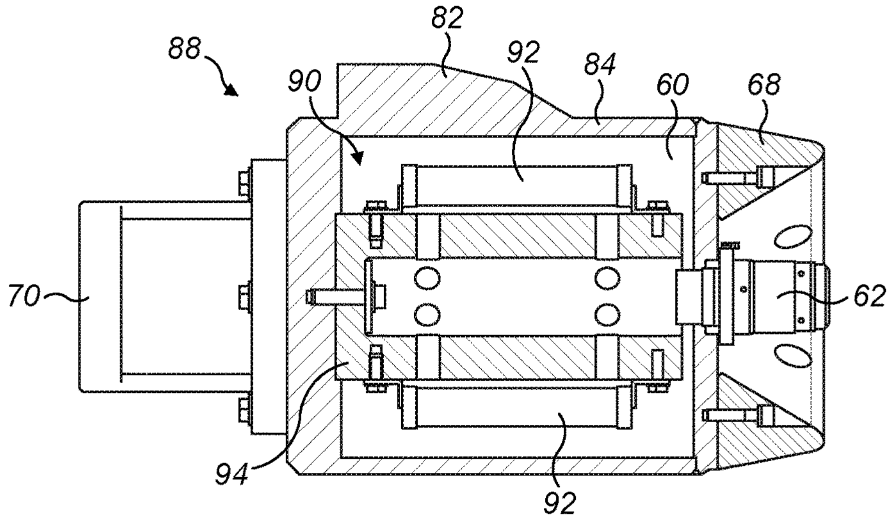
FIG. 15 is a sectional side view of the plug, taken on line A-A of FIG. 14.

To illustrate some of these possibilities, reference is made finally to FIGS. 13 to 15 that show a plug 88 being a variant of the plug 62 shown in FIGS. 7 to 12. Like numerals are used for like parts. Here, the internal cavity 60 of the plug 88 contains a fuse magazine 90 comprising fuse capsules 92 spaced angularly around a central longitudinal spine 94 that connects the fuse capsules to appropriate pins 96 of the plug 62. The fuses need no longer be potted in their capsules 92, but the wall 84 of the plug 88 is pressure-resistant and can contain ambient-pressure air around the fuses.

Alternatively, a pressure-compensation system may be used to balance internal air pressure within the cavity 60 against external hydrostatic pressure.

Whilst preferred embodiments of the invention are adapted for use with a UUV such as an ROV, a UUV need not necessarily be involved. In principle, a manned submersible or a diver may connect, remove or replace fuses instead. Also, a wet-mateable connector could also effect parallel hydraulic connections or data connections such as optical connections between subsea systems. For example, a stab connector of a type well-known in the art may be arranged to connect hydraulic circuits in parallel with electrical connections.

Another potential use of a subsea-replaceable fuse assembly of the invention is for fault-finding purposes. A maintenance or fault-finding unit with certain configurations of enabled fuses can be mated into a wet-mate socket to provide a way of diagnosing and isolating an electrical fault or a faulty item of equipment. Only some of the fuses in the assembly are enabled for maintenance or fault-finding purposes and others are omitted or isolated.

Thus, for example, where a standard fuse assembly contains six fuses, a maintenance kit may comprise a corresponding first isolation fuse assembly with only fuses 1 to 3 enabled and a corresponding second isolation fuse assembly with only fuses 4 to 6 enabled.

The invention claimed is:

1. A subsea-replaceable fuse assembly comprising:

a plurality of fuses; and a wet-mateable fuse connector element arranged to connect the fuse assembly to a subsea electrical load requiring protection of the fuse, wherein the fuse connector element comprises conductor elements that are electrically connected to the plurality of fuses, the conductor elements defining a plug for engagement with a socket provided on the subsea electrical load to connect the plurality of fuses electrically to the subsea load; and wherein the fuse connector element comprises a body having a recess surrounded by a skirt, the recess housing the plug, such that when the plug is engaged with a socket on the subsea electrical load, the skirt is received in a recess on the socket to seal the recess in the body of the fuse connector element.

2. The fuse assembly of claim 1, further comprising a subsea cable extending between the fuse connector element and a fuseholder module containing the fuse, which cable electrically connects the fuses to the conductor elements and supports the housing from the fuse connector element.

3. The fuse assembly of claim 2, wherein the cable is filled with a dielectric liquid.

4. The fuse assembly of claim 1, wherein the fuses are contained in a fuseholder module that is integral with the fuse connector element.

5. The fuse assembly of claim 2, wherein the fuses are supported in air in the fuseholder module.

6. The fuse assembly of claim 5, wherein the air in the fuseholder module is at ambient pressure.

7. The fuse assembly of claim 2, wherein the fuseholder module is arranged to isolate the fuse from water.

8. The fuse assembly of claim 1, wherein the fuse connector element comprises a UUV handle arranged to be grasped for manipulation by a UUV.

9. The fuse assembly of claim 1, wherein the fuses are potted in a capsule.

10. The fuse assembly of claim 1, wherein the fuseholder module has a plurality of chambers, each chamber holding a fuse.

11. The fuse assembly of claim 10, wherein the subsea cable comprises a bundle of cables, which cables electrically connect each of the plurality of fuses to the conductor elements.

12. In combination, the fuse assembly of claim 1 and a subsea electrical load that is electrically connected to corresponding conductor elements of a complementary load connector element.

13. The combination of claim 12, further comprising a subsea installation including the subsea electrical load.

14. A subsea installation including an electrical load, the subsea-replaceable fuse assembly of claim 1, and a wet-mateable load connector element arranged to connect the load to the subsea-replaceable fuse assembly, the load connector element comprising conductor elements that are electrically connected to the load.

15. A method of protecting a subsea electrical load, the method comprising connecting a plurality of fuses to the load underwater in a wet-mating operation effected between connector elements that are electrically connected, respectively, to the fuses and to the load, wherein the connector element comprises a plug arranged in a recess on a body of the connector element, the recess being surrounded by a skirt, and wherein the method further comprises inserting the plug into a socket on the load such that the skirt engages with the socket to seal the recess.

16. The method of claim 15, comprising connecting the plurality of fuses to the load underwater in a single wet-mating operation.

* * * * *